Patented Aug. 21, 1934

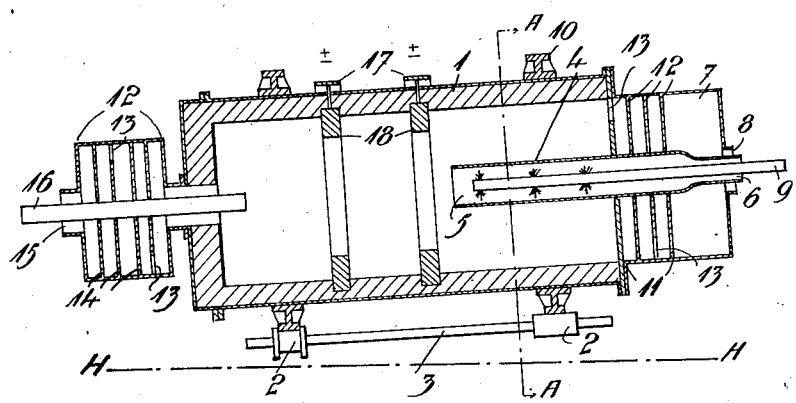

1,971,041

UNITED STATES PATENT OFFICE 1,971,041

PROCESS FOR PURIFYING IRON FROM SULPHUR

Bo Michael Sture Kalling, Djursholm, and Carl von Delwig, Avesta, Sweden, assignors to A. Johnson & Co., Stockholm, Sweden, a firm of Sweden Original application June 2, 1931, Serial No. 541,666. Divided and this application March 9, 1932, Serial No. 597,700. In Sweden May 8, 1930

7 Claims. (Cl. 75—14)

This is a division of our application filed June 2nd, 1931, Serial Number 541,666, and priority is claimed for the present application from the date of said application.

In the reduction of iron ore without melting by heating a charge consisting of ore and coal, the greater part of the sulphur present in the charge is contained as sulphide in the iron sponge which is formed. If the ore is free from sulphur and if a sulphur-free reducing agent, such as for example wood charcoal, is used, then a product which is perfectly free from sulphur is readily obtained, but the costs of production are relatively high particularly owing to the high price of the sulphur-free carbon material. By adding lime to the charge the sulphur content of the sponge may be diminished somewhat but a more complete avoidance of sulphur absorption in connection with the reduction is only successfully to be brought about by placing the lime in a special zone between the ore and the coal (carbon) as a result of which the sulphur in the reducing gas is absorbed in the lime layer before the gas reaches the iron ore. On the other hand, when reduction is carried out with a charge consisting of an intimate mixture of ore and coal, such as for example in the case of the processes carried out in rotating furnaces, it has not been possible to keep the sulphur content low when reducing the sulphur-containing charges. An addition of lime to the charge does not in this case lead to any appreciable diminution in the absorption of sulphur during the reduction and, furthermore, the lime is attended by the drawback that the charge readily sinters together into lumps during the reduction at the temperatures coming into question, or else it adheres to the walls of the furnace and impedes the operation. This tendency is particularly present in those furnaces in which the heating is effected by passing the electric current through the charge, in which case the lime also adversely affects the conducting resistance of the charge.

The reason for the small or negligible effect of the lime addition in this case is that the iron has a greater tendency under conditions which prevail in the course of the reduction, to absorb the sulphur than the lime has, and consequently the main part of the sulphur forms iron sulphide in spite of the lime which has been added.

According to the present invention the absorption of sulphur in the iron sponge is not prevented during the reduction, but the invention consists instead of a process for freeing the iron sponge formed from the greater portion of its sulphur content obtained during the reduction. The most important reaction which lies at the basis of the process is the following:

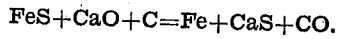
$$FeS+CaO+C=Fe+CaS+CO.$$

It has been found that this reduction, which is employed in the known processes for purifying iron, in the fused state, from sulphur, also can take place in certain circumstances when heating to lower temperature without any fusion occurring and with obtention of a practically sulphur-free iron product.

It has been found that in order to attain an effective purification from sulphur, according to the invention, the following circumstances must be observed.

1. From the standpoint of economy a temperature of about 800° C. is the most suitable in the majority of cases. The cooling down at the end of the purification may be effected rapidly or slowly with approximately the same result in both cases.

2. The lime ought best to be added in the form of burnt lime, but it may also be added in the slaked form or in the form of limestone. It ought to be present in considerable excess over the quantity necessary according to the reaction. It has been found that in the purification of iron sponge containing about 0.300% of sulphur to a content of about 0.030% of sulphur a necessary suitable lime addition is, in certain cases, at least ten times the equivalent quantity of lime according to the reaction with the removed sulphur, but if a sulphur-purifying effect of another degree is desired, then of course the addition of lime must be adjusted to that end, and, since the conditions can also change in other respects, the necessary quantity of lime must be determined by preliminary experiments in each individual case.

3. The reduction coal (carbon) on the other hand need not be added in excess. It has been found that the reaction even proceeds satisfactorily without addition of coal or carbon, owing to the fact that the iron sponge itself acts as an effective reducing agent in the form in which it is present.

4. Since the reaction takes place between solid bodies, with exception of the escaping carbon monoxide, it must be considered that the transference of sulphur from the iron to the lime is effected by diffusion in the gas phase. It is therefore of importance for rapid reaction that the path for this gaseous diffusion is shortened to the shortest possible extent, that is to say, the constituents of the charge should be as finely crushed and as intimately mixed as possible. It has been found that the lime obtains the greatest reaction capability if it has been first of all burnt and, after burning wholly or partially slaked and thereby has disintegrated to a fine powder which is then converted anew into calcium oxide before or during the process for purifying from sulphur. The coal or carbon which is added if necessary must also be finely granular, and fine charcoal powder has turned out to be particularly suitable for the process. The iron sponge is obtained directly in finely granular form by many processes, but a crushing of the same is desirable in most cases before the sulphur purification.

5. In order to accelerate the diffusion of the sulphur a good effect has been found to ensue from supplying a gas in the course of the process which brings about increased diffusion velocity, such as for example hydrogen gas or some other gas having a low molecular weight, e. g. carbon monoxide.

6. It has been found that stirring during the process accelerates the reaction.

7. The time which is necessary for carrying out the process is, as stated above, to a large extent dependent on the manner in which the process is carried out. As a guide to the time which is necessary it may be mentioned that with a charge consisting of 100 parts of iron sponge, 10 parts of burnt lime, and 8 parts of coke, which has been heated to 800° C. without any agitation whatsoever and without supply of any gases and has been maintained at this temperature for one hour, showed after cooling a desulphurization from about 0.300% of sulphur in the initial sponge to about 0.030% in the sponge obtained as a result of the treatment.

In the foregoing only lime has been mentioned as a substance capable of taking up sulphur. However, the lime may be replaced wholly or partially by other metal compounds (preferably of one of the metals, calcium, magnesium or barium) such as oxides, hydroxides, carbonate and other oxide compounds, carbides, etc. Of course, free metals may also come into question although with a result which is less advantageous from the point of view of economy. Among the carbides calcium carbide may be particularly mentioned.

The reducing agent which is used, if necessary, may consist, besides of coal or carbon in the solid state, of carbon containing substances in solid liquid or gaseous form as well, and also reducing agents to be added other than those which contain carbon, e. g. hydrogen gas.

The main principle of this process accordingly consists in mixing the sulphur containing iron with a metal, or compound of such a metal, which has a great tendency of combining with sulphur, and heating the mixture without fusion in presence of a reducing agent, when, according to what has been said above, this is necessary.

Many methods of operation are available for carrying out the process on a practical scale. Since the most important application of the process is the purification of iron sponge obtained by reduction of a mixture of finely divided ore and coal (carbon) in a rotary furnace, a suitable form of the process according to the invention for carrying out this purification will be described by way of an example.

When carrying out the reduction in such furnaces carbon or coal must be added in excess in order to prevent the ore from caking together during the reduction. When the reduction has been carried out, the product, therefore, consists of an intimate mixture of iron sponge and coal (carbon) and only the addition of lime and the lowering of the temperature to that which is most suitable for purifying from sulphur is necessary for the sulphur purification to take place. The process may either be carried out in the reducing furnace itself, which then must be made longer so that the charge, after addition of the lime, remains in the furnace for a certain time before it is discharged from the same, or else the charge may be transferred into another furnace where it is heated for a sufficiently long time at the desired temperature. This process, however, is not advantageous from all points of view. In the first place the iron sponge formed tends to be less finely granular than is desirable, since caking together of the granules of ore to form larger units takes place in the course of the reduction. The iron sponge formed, therefore, is best crushed in some manner or other before the refining in order to accelerate the process, which crushing is preferably not effected before the product has cooled down. Further, it has been found that the sulphur purification proceeds worse when carried out in direct sequence to the reduction process than when the iron sponge has first been able to cool down and thereupon is heated anew together with lime and, if necessary, coal (carbon), even if no crushing is previously effected. A further advantage of carrying out the process after the sponge has been able to cool down, is that the reduction charge best contains a very considerable quantity of coal (carbon) in excess which then enters the furnace anew, whilst the refining process requires no more than a very small quantity of coal (carbon).

A suitable process is the following: After the reduction the iron sponge is allowed to cool down together with the excess of coal (carbon) and thereupon is separated out magnetically. The iron sponge is then crushed in a suitable mill and thereupon mixed with finely powdered lime and, if necessary, coal powder in suitable proportions. This mixture is heated to about 800° C. in a suitable furnace for about an hour, the time depending on the granule size and the desired efficiency of the refining, after which the mixture may then cool down and the iron sponge is magnetically separated out again.

The most suitable type of furnace for this sulphur purification is the rotary or rolling type. Either electrical heating may then be used or heat may be supplied to the furnace by combustion of suitable fuel, or a furnace may be employed having a combination of both heating principles. The electrical heating may be effected by conducting electric current through the charge or a portion of the same, in which case the charge must serve as heating resistance, but since the charge with a high lime content is a somewhat bad conductor for the electric current it may at times be more preferable to install special resistance elements in the furnace through which the current can pass.

Heating by means of fuel is best effected by burning the fuel in, and the combustion gases must pass through, chambers or pipe systems placed centrally in the furnace, through the walls of which the heat is transferred to the surrounding charge, which latter is in continuous motion owing to the rotation of the furnace and consequently is uniformly and effectively heated. If desired, the combustion may be carried out outside the furnace, in which case the heating of the latter is brought about by conducting only the combustion gases through the central chambers or pipe systems.

In the foregoing the suitability of the method has been dealt with mainly for the desulphurization of iron sponge produced by reduction of a mixture of ore and coal (carbon) in a rotary furnace, but, of course, the process is also adapted for iron sponge made by other methods, e. g. gas reduction processes with sulphur containing gases and/or ores, in which case the forms of execution here described may also be employed in appropriate parts.

Also, the method is not limited merely to the product which usually goes under the name of iron sponge, but it embraces a purification of all iron containing sulphur in a form which is so finely divided that it is suitable for the process in question.

In order to render the invention clear a constructional example of a furnace for carrying out the reduction process is illustrated diagrammatically by way of example in the accompanying drawing.

Fig. 1 shows the furnace in longitudinal section.
Fig. 2 is a cross section A—A of Fig. 1.

1 indicates the rotating furnace itself which is carried in a known manner by rotatable rollers 2 connected in pairs by means of an axle 3, and if necessary also constructed that they can serve to set the furnace in rotation. 4 is a tube or tubular combustion chamber disposed centrally in the interior of the furnace, which communicates with the interior of the furnace space through the aperture 5, and at the charging end of the furnace is provided with an opening 6 for leading away gas obtained by the process which before leaving the furnace is partly or wholly burnt by means of air admitted through the tube 9. The combustion chamber is surrounded at its outer end by a chamber 7 which is intended to serve as a pre-heating and drying chamber, for the charge, i. e. the iron to be purified in admixture with one or more metals or compounds of metals and, if found necessary, reducing agents, for instance coal or carbonaceous material in a solid state, which is fed into this chamber through the opening 8. The charge before reaching the furnace chamber proper passes a lock arrangement 11, which in the form shown in the drawing preferably consists of a number of separating walls 12, each of which is provided at its periphery with a cut-out part 13, distributed in relation to each other so that when the furnace rotates one of them is at the bottom immerged in the material supplied, which in this way prevents gas from passing out of the interior of the furnace. A similar lock arrangement 14 is also provided at the discharging end of the furnace and is provided with an outlet opening 15 so that the treated material may leave the furnace without gas passing out through the opening. At the discharging end of the furnace there is provided a centrally disposed tube 16 through which suitable reducing gas (or liquid reducing agent) is led into the furnace chamber. The supply of heat required in excess of that generated by the combustion of the reduction gas in the chamber 4 is supplied to the furnace by means of electric current which is supplied in the usual manner through slip rings 17 to the contact rings or electrodes 18, between which the current passes through charge and heats it. The line H—H indicates the horizontal plane. The geometrical axis of the furnace is therefore higher at the charge end, so that during the rotation of the furnace the material will pass automatically through the furnace.

The process is going on in the way above stated.

Having thus described our invention we declare that what we claim is:—

1. A process of reducing iron ore, which comprises heating the iron ore without smelting with a reducing agent to form a sulfur-containing iron sponge, and thereafter refining the sulfur-containing iron sponge by heating said iron sponge without fusion with at least one compound of the alkaline earth metals capable of binding sulfur contained in the iron sponge to cause the sulfur to combine with the metal of said compound.

2. A process of reducing iron ore, which comprises heating the iron ore without smelting with a reducing agent to form a sulfur-containing iron sponge, thereafter refining the sulfur-containing iron sponge by heating said iron sponge without fusion with at least one compound of the alkaline earth metals capable of binding sulfur contained in the iron sponge to cause the sulfur to combine with the metal of said compound, and adding at least one reducing agent to promote the combination of the sulfur with said metallic compound.

3. A process of reducing iron ore, which comprises heating the iron ore without smelting with a reducing agent to form a sulfur-containing iron sponge, thereafter refining the sulfur-containing iron sponge by heating said iron sponge without fusion with at least one compound of the alkaline earth metals capable of binding sulfur contained in the iron sponge to cause the sulfur to combine with the metal of said compound, and adding a hydrogen-containing gas in order to increase the diffusion-velocity of the sulfur.

4. A process of reducing iron ore, which comprises heating the iron ore without smelting with a reducing agent to form a sulfur-containing iron sponge, and thereafter refining the sulfur-containing iron sponge by heating said iron sponge without fusion with at least one compound of the alkaline earth metals capable of binding sulfur contained in the iron sponge to cause the sulfur to combine with the metal of said compound, the compound of alkaline earth metal added being in greater quantity than that equivalent to the quantity of sulfur to be removed.

5. A process of reducing iron ore, which comprises heating the iron ore without smelting with a reducing agent to form a sulfur-containing iron sponge, thereafter refining the sulfur-containing iron sponge by heating said iron sponge without fusion with at least one compound of the alkaline earth metals capable of binding sulfur contained in the iron sponge to cause the sulfur to combine with the metal of said compound, the alkaline earth compound being added in a finely divided state, and all the materials being maintained in constant motion during reaction by rotating the container of the charge.

6. A process of reducing iron ore, which comprises heating the iron ore without smelting with a reducing agent to form a sulfur-containing iron sponge, and thereafter refining the sulfur-containing iron sponge by heating said iron sponge without fusion with at least one compound from the group consisting of the carbides and oxygen compounds of the alkaline earth metals capable of binding sulfur contained in the iron sponge to cause the sulfur to combine with the metal of said compound.

7. A process of reducing iron ore, which comprises heating the iron ore without smelting with a reducing agent to form a sulfur-containing iron sponge, and thereafter, while the iron sponge is still hot, refining the sulfur-containing iron sponge by heating said iron sponge without fusion with at least one compound of the alkaline earth metals which is capable of binding sulfur obtained from the iron sponge to cause the sulfur to combine with the metal of said compound.

BO MICHAEL STURE KALLING.
CARL von DELWIG.